United States Patent [19]

Allen

[11] Patent Number: 4,589,174
[45] Date of Patent: May 20, 1986

[54] POLAR COORDINATE APPARATUS

[75] Inventor: Dell K. Allen, Orem, Utah

[73] Assignee: Brigham Young University, Provo, Utah

[21] Appl. No.: 593,730

[22] Filed: Mar. 27, 1984

[51] Int. Cl.$^4$ .............................. B23C 1/12; B23C 1/14
[52] U.S. Cl. ...................................... 29/33 R; 409/201; 409/216
[58] Field of Search ................. 29/26 A, 33 R; 408/3, 408/16, 88, 234, 235, 129; 409/107, 199, 201, 211, 216, 230

[56] References Cited

U.S. PATENT DOCUMENTS

| | | | |
|---|---|---|---|
| 1,004,620 | 10/1911 | Berold | 409/215 X |
| 1,080,356 | 12/1913 | MacGregor | 408/129 |
| 1,212,330 | 1/1917 | Daly | 409/230 |
| 2,393,696 | 1/1946 | Kraut et al. | 29/26 |
| 2,499,842 | 3/1950 | Armitage | 90/15 |
| 2,539,107 | 1/1951 | Sectish | 51/56 |
| 2,835,172 | 5/1958 | Barker et al. | 90/15 |
| 3,125,932 | 3/1964 | Katona | 90/15 |
| 3,668,971 | 6/1972 | Dever | 409/203 X |
| 3,806,691 | 4/1974 | Roach | 219/69 G |
| 3,998,127 | 12/1976 | Romeu | 408/234 X |
| 4,231,694 | 11/1980 | Unigovsky et al. | 409/179 |
| 4,369,563 | 1/1983 | Williamson | 29/26 A X |

FOREIGN PATENT DOCUMENTS

R 14122  2/1956  Fed. Rep. of Germany ...... 408/235

Primary Examiner—Eugene F. Desmond
Attorney, Agent, or Firm—Workman, Nydegger & Jensen

[57] ABSTRACT

A polar coordinate apparatus for performing an operation on a three-dimensional workpiece. The apparatus comprises an arcuate track having a rigid carrier member slidably supported thereon, such carrier including a motor for selectively positioning the carrier along the arcuate track. A radial support arm is slidably connected to the carrier and is provided with a motor for controlling the position of the radial support arm with respect to the carrier. Further, a working implement, such as a milling device, is connected adjacent one end of the radial support arm so as to be capable of engaging a workpiece. Advantageously, the radial support arm may also be rotatable with respect to its point of connection to the carrier, and the working implement may be rotatable with respect to its point of connection to the radial support arm.

A workpiece is supported on a rotatable turret plate, and a motor is provided for rotating the turret plate, together with the workpiece, about a substantially vertical axis. The turret plate is also slidably supported by horizontal guide rods, and a motor is provided for selectively positioning the turret plate and workpiece along such guide rods. The guide rods are oriented so as to be both substantially horizontal and substantially perpendicular to the plane defined by the arcuate track.

31 Claims, 5 Drawing Figures

POLAR COORDINATE APPARATUS

BACKGROUND

1. The Field of the Invention

This invention relates to mechanical apparatus for operating on three-dimensional workpieces and, more particularly, to novel apparatus for operating on three-dimensional workpieces wherein the working implement is easily manipulated to perform both curvilinear and rectilinear operations.

2. The Prior Art

During recent years, it has become increasingly common to use various machines and mechanical devices to perform a variety of industrial manufacture and design operations. Notably, many of the devices which are currently in use are capable of quickly performing quite complex operations. As a result, the use of such devices has greatly increased the speed and accuracy with which many phases of industrial production may be completed. Moreover, with various types of central processing units, such as microprocessors, becoming more inexpensive and readily available, it has further become quite common to eliminate the need for a human operator in some production phases by controlling the operation of the above-mentioned devices with computer software. Such a use of computers can, of course, further enhance the speed and accuracy of the devices and provide substantial savings in time and money to both industry and consumers.

One general type of device which is frequently employed in industrial applications is a device which is capable of performing one or more manufacture or design operations on a three-dimensional workpiece. Such devices include, for example, mechanical devices which are used to machine or mill a three-dimensional object to a desired shape. Such devices also include assembly devices for placing individual components onto a three-dimensional structure or housing.

Of course, one important requirement for such devices is that they be able to contact or reach all of the relevant portions of the three-dimensional workpiece being operated upon. Hence, these devices typically include a working implement, together with structure designed to move the implement relative to a workpiece. The devices generally also include some structure for moving the workpiece relative to the implement.

One of the most common types of such prior art devices comprises a working implement which is connected to structure for moving the implement in two substantially perpendicular, linear directions. In addition, these devices further include structure for moving the workpiece in a third linear direction which is substantially perpendicular to both of the directions in which the implement may be moved.

Prior art devices of this type may, for example, comprise a working implement which is slidably maintained on a substantially horizontal, linear track, the horizontal track being further slidably connected to two substantially vertical, linear tracks. Thus, the implement may be selectively positioned within a substantially vertical plane by appropriately positioning both the implement along the horizontal track and the horizontal track along the two vertical tracks. Such prior art devices further include a mechanism for selectively translating the workpiece beneath the horizontal track in a substantially horizontal direction, thereby permitting the working implement to selectively operate on various portions of the workpiece.

Another type of prior art device for operating on a three-dimensional workpiece includes structure for providing an arcuate movement of the working implement with respect to the workpiece. Such devices are typically configured so as to be substantially identical to the prior art devices described above, except that such devices include an arcuate track in place of the above-described horizontal, linear track. Hence, in this second type of prior art device, the working implement may be moved both vertically and arcuately with respect to the workpiece being operated upon.

While the prior art devices mentioned above are capable of performing a variety of operations on three-dimensional workpieces, such prior art devices have a number of significant drawbacks and disadvantages. First, the prior art devices are not well adapted to moving a working implement in a curvilinear direction.

It will be readily appreciated that the operations to be performed by the above-described prior art devices are generally defined (due to the structure of such devices) in terms of a cartesian coordinate system (that is, a coordinate system wherein every point in three-dimensional space is defined by its position relative to three mutually perpendicular axes). In the first type of prior art device described above, for example, a point at which the implement is to operate on a workpiece is structurally defined by the vertical position of the horizontal track, the postion of the implement along the horizontal track, and the position of the workpiece along a substantially horizontal axis which passes beneath the horizontal track. Similarly, a point at which the second type of prior art device mentioned above is to operate on a workpiece is structurally defined by the vertical position of the arcuate track, the position of the implement along the arcuate track, and the position of the workpiece along a substantially horizontal axis which passes beneath the arcuate track. Thus, notwithstanding the arcuate movement of the implement in the second type of prior art device described above, the operations of such device are still structurally defined in terms of a basically cartesian-type coordinate system.

As a result of this structurally-required cartesian coordinate definition of the operations to be performed by the prior art devices, it is often quite difficult to accurately control the prior art devices so as to cause the working implement to follow a selected curvilinear path. This is due, in large part, to the fact many of the cartesian coordinate definitions of curvilinear surfaces are quite complex. Consequently, even when the prior art devices are controlled by a suitable central processing unit, substantial programming may be required in order to adequately define a desired curvilinear movement. Hence, it may, for example, be very difficult to use the prior art devices to machine or mill a workpiece to a desired curvilinear shape. In this regard, it should be noted that most industrial designs include at least one curvilinear edge or surface.

In addition to the foregoing difficulties relating to curvilinear movement, the prior art devices are also generally incapable of approaching a workpiece from various skew or angular directions. Significantly, such an angular approach to a workpiece is quite often preferred in design and manufacture applications, such as, for example, when attaching or assembling component parts to a workpiece or when forming one or more holes or cavities in a workpiece. Thus, for example, if numerous holes are to be drilled in a workpiece, the prior art devices may be unable to drill holes which are not substantially parallel to one another without the workpiece being successively manually realigned between drillings.

Further, the prior art devices are also typically complex, and they may require frequent adjustment and maintenance. For example, the two vertical tracks of the prior art devices, which are used for adjusting the vertical position of the implement, must be accurately synchronized and controlled such that the horizontal or arcuate track is continuously maintained in the proper orientation. Notably, if one side of the horizontal or arcuate track is moved vertically farther than the other side, the prior art devices will need to be serviced and properly adjusted before they can again accurately perform a desired operation. This, of course, significantly increases the cost of using the prior art devices in industry.

Accordingly, it would be an improvement in the art to provide an apparatus for operating on a three-dimensional workpiece wherein the working implement is easily adapted to curvilinear motion. It would also be an improvement in the art to provide an apparatus for operating on a three-dimensional workpiece which is capable of approaching the workpiece from virtually any direction. In addition, it would be an improvement in the art to provide an apparatus for operating on a three-dimensional workpiece which does not require frequent adjustment and maintenance. Further, it would be an improvement in the art to provide an apparatus for operating on a three-dimensional workpiece which may be readily controlled by a central processing unit to perform a wide variety of operations and movements. Such apparatus are disclosed and claimed herein.

BRIEF SUMMARY AND OBJECTS OF THE INVENTION

The present invention is directed to a polar coordinate apparatus for performing an operation on a three-dimensional workpiece. The apparatus comprises an arcuate track having a rigid carrier member slidably supported thereon, such carrier including a motor for selectively positioning the carrier along the arcuate track. A radial support arm is slidably connected to the carrier and is provided with a motor for controlling the position of the radial support arm with respect to the carrier. Further, a working implement, such as a milling device, is connected adjacent one end of the radial support arm so as to be capable of engaging a workpiece. Advantageously, the radial support arm may also be rotatable with respect to its point of connection to the carrier, and the working implement may be rotatable with respect to its point of connection to the radial support arm.

A workpiece is supported on a rotatable turret plate, and a motor is provided for rotating the turret plate, together with the workpiece, about a substantially vertical axis. The turret plate is also slidably supported by horizontal guide rods, and a motor is provided for selectively positioning the turret plate and workpiece along such guide rods. The guide rods are oriented so as to be both substantially horizontal and substantially perpendicular to the plane defined by the arcuate track.

It is, therefore, a primary object of the present invention to provide an apparatus for performing an operation on a three-dimensional workpiece which may be easily manipulated to perform a wide variety of operations from a wide variety of different approach angles.

Additionally, it is an object of the present invention to provide a polar coordinate apparatus which may be readily manipulated such that the working implement follows a desired curvilinear path.

It is a further object of the present invention to provide an apparatus for operating on a three-dimensional workpiece which may be readily controlled to approach the workpiece from virtually any angular direction.

It is a still further object of the present invention to provide an apparatus for operating on a three-dimensional workpiece which is easy to maintain in adjustment and requires minimal maintenance.

Also, it is an object of the present invention to provide an apparatus for operating on a three-dimensional workpiece which may be easily controlled by a central processing unit so as to perform a wide variety of operations.

These and other objects and features of the present invention will become more fully apparent from the following description and appended claims, taken in conjunction with the accompanying drawings.

DETAILED DESCRIPTION OF THE PREFERRED EMBODIMENT

It will be readily appreciated that the components of the present invention, as generally described and illustrated in the figures herein, could be arranged and designed in a wide variety of different configurations. Thus, the following more detailed description of the embodiment of the apparatus and method of the present invention, as represented in FIGS. 1 through 5, is not intended to limit the scope of the invention, as claimed, but it is merely representative of one presently preferred embodiment of the invention.

Figure 1:
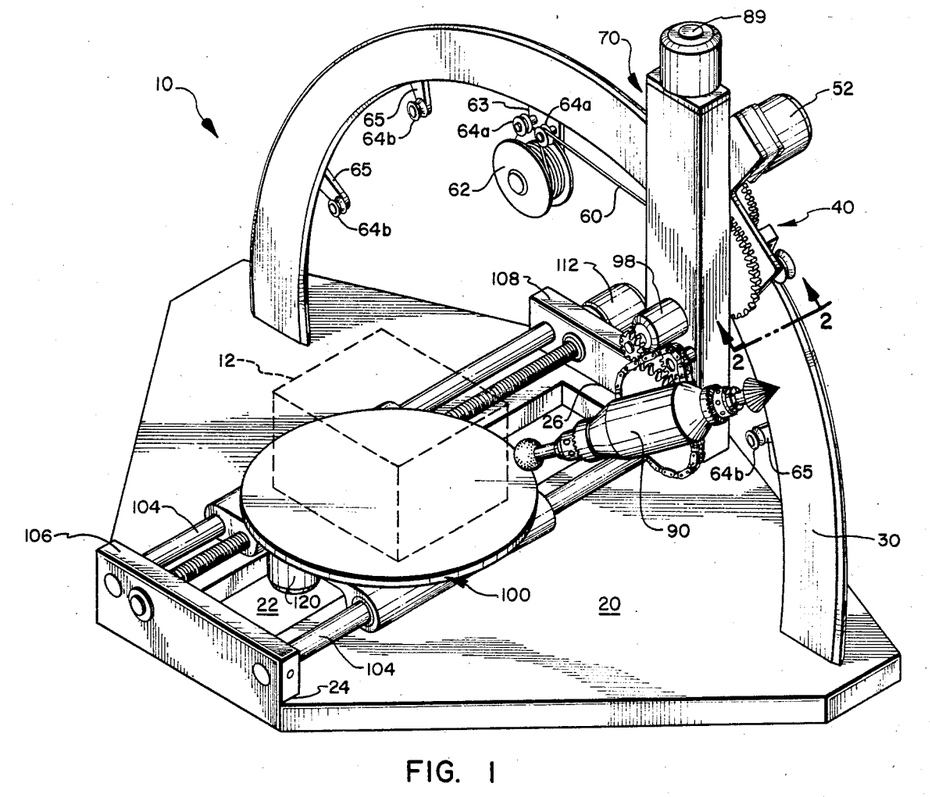
FIG. 1 is a front perspective view of one presently preferred embodiment of the polar coordinate apparatus of the present invention, particularly illustrating the use of the apparatus with a three-dimensional workpiece.

The polar coordinate apparatus of the present invention, designated generally at 10, is illustrated in FIG. 1 as it would be used in connection with a three-dimensional workpiece 12. As shown, polar coordinate apparatus 10 comprises an arcuate track 30 which is connected to a rigid base member 20. A carrier member 40 is slidably mounted on arcuate track 30 and may be selectively positioned along arcuate track 30 by means of a motor 52.

A radial support arm 70 is slidably attached to carrier 40 so as to lie in a substantially vertical plane. Radial arm 70 may be selectively positioned with respect to carrier 40 by means of a motor 89. Further, radial arm 70 may be rotatable with respect to its point of connection to carrier 40, as set forth in more detail below.

A working implement 90, such as, for example, a milling device, is mounted adjacent one end of radial arm 70. Optionally, such implement 90 may also be rotatable about its point of connection to radial arm 70 by means of a motor 98, as discussed below.

A three-dimensional workpiece 12 which is to be operated upon is supported by a turret 100. As further described below, turret 100 is capable of rotating workpiece 12 about a substantially vertical axis by means of a motor 120. In addition, turret 100 is slidably maintained on guide rods 104, and turret 100 may be selectively positioned along guide rods 104 by a motor 112. Thus, the possible positionings of workpiece 12, together with the possible positioning movements of implement 90, allow polar coordinate apparatus 10 to perform a wide variety of different operations on workpiece 12 from a wide variety of different approach angles.

Having now described the general configuration and structure of polar coordinate apparatus 10, the more specific structure of each of the various components of polar coordinate apparatus 10 is discussed in turn below.

As illustrated in FIG. 1, base 20 of polar coordinate apparatus 10 provides support for all of the various components of polar coordinate apparatus 10. As shown, base 20 forms a substantially flat surface and may have some suitable polygonal shape. The specific shape which is chosen for base 20, however, is not critical, the particular shape illustrated in FIGS. 1 and 3 herein being chosen to facilitate manufacture of base 20 and minimize the cost of materials.

In addition, base 20 may be formed in any suitable manner. For example, base 20 may be formed as a solid, rigid unit. Alternatively, base 20 may comprise a frame structure having a suitable, rigid top plate secured thereto. As shown, base 20 is also provided with recesses 22, 24, and 26, the function of which will be discussed more fully below. Further, although base 20 is illustrated herein as being a separate, stand-alone unit, it will be readily appreciated that base 20 could comprise a portion of a fixed structure or building in which polar coordinate apparatus 10 is to be used.

Arcuate track 30 is secured to base 20 in some suitable manner, such as, for example, by welding. Preferably, arcuate track 30 is secured to base 20 so as to lie in a plane which is substantially perpendicular to base 20, as shown.

Figure 2:
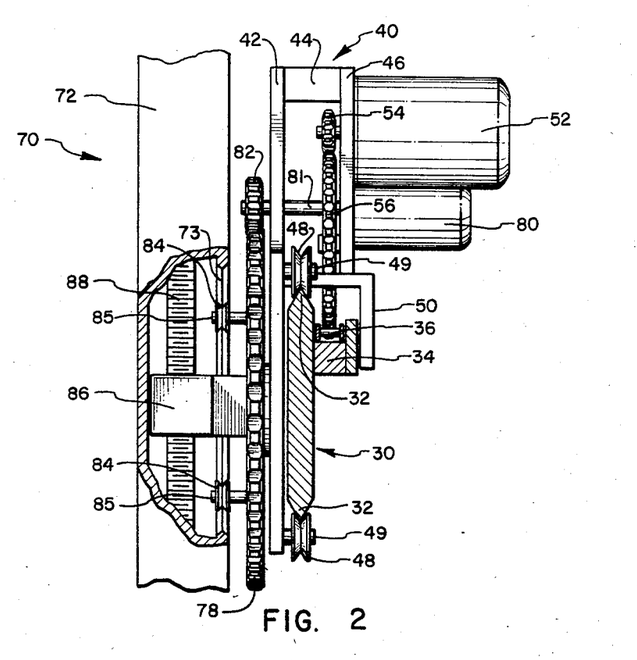
FIG. 2 is a cross-sectional view taken along lines 2—2 of FIG. 1.

As depicted in FIG. 2, arcuate track 30 is formed so as to include two knife edge tracks 32. Knife edge tracks 32 serve to suspend and guide carrier 40, as set forth more fully below. Moreover, arcuate track 30 is provided with a shallow channel 34 along the rearward side thereof, and a chain 36 is secured within channel 34. The specific purpose and function of channel 34 and chain 36 will also become more readily apparent from the discussion which follows.

In some applications, it may be advantageous to provide a brace or support for arcuate track 30. In such cases, a suitable brace may be connected to the rearward side of arcuate track 30 and extend downwardly toward and be secured to base 20. Further, although arcuate track 30 is illustrated herein as being a substantially unitary structure, it will be appreciated that arcuate track 30 could comprise an arcuate frame to which a separate, double knife edge track is bolted or clamped. Such an alternate means for providing knife edge tracks 32 of arcuate track 30 may advantageously permit fine adjustments to be made to knife edge tracks 32, if necessary. Further, by forming knife edge tracks 32 separately from the remainder of arcuate track 30, knife edge tracks 32 could be easily replaced when worn or damaged.

The particular structure and configuration of carrier 40 is also shown best in FIG. 2. As illustrated, carrier 40 comprises a front plate 42 and a back plate 46 which are connected by means of a small top plate 44. Four wheels 48 are rotatably mounted by wheel posts 49 to front plate 42 of carrier 40. Importantly, wheels 48 are formed so as to be adapted to roll along knife edge tracks 32 of arcuate track 30. Also, as shown best in FIG. 3, wheels 48 are positioned so as to both suspend and retain carrier 40 along arcuate track 30. In addition, an L-shaped retaining arm 50 extends rearwardly from front plate 42 of carrier 40 around channel 34 of arcuate track 30. Retaining arm 50, thus, also helps retain carrier 40 on arcuate track 30.

As further shown in FIG. 2, a large sprocket 56 is rotatably journaled in back plate 46 of carrier 40. Significantly, sprocket 56 is positioned so as to engage chain 36 in channel 34 of arcuate track 30. A motor 52 is also mounted to back plate 46 of carrier 40, as shown, and motor 52 is drivingly connected to a drive sprocket 54 which further drivingly engages sprocket 56. Thus, by operating motor 52, sprocket 54 may drive sprocket 56 so as to selectively drive carrier 40 along arcuate track 30.

Figure 3:
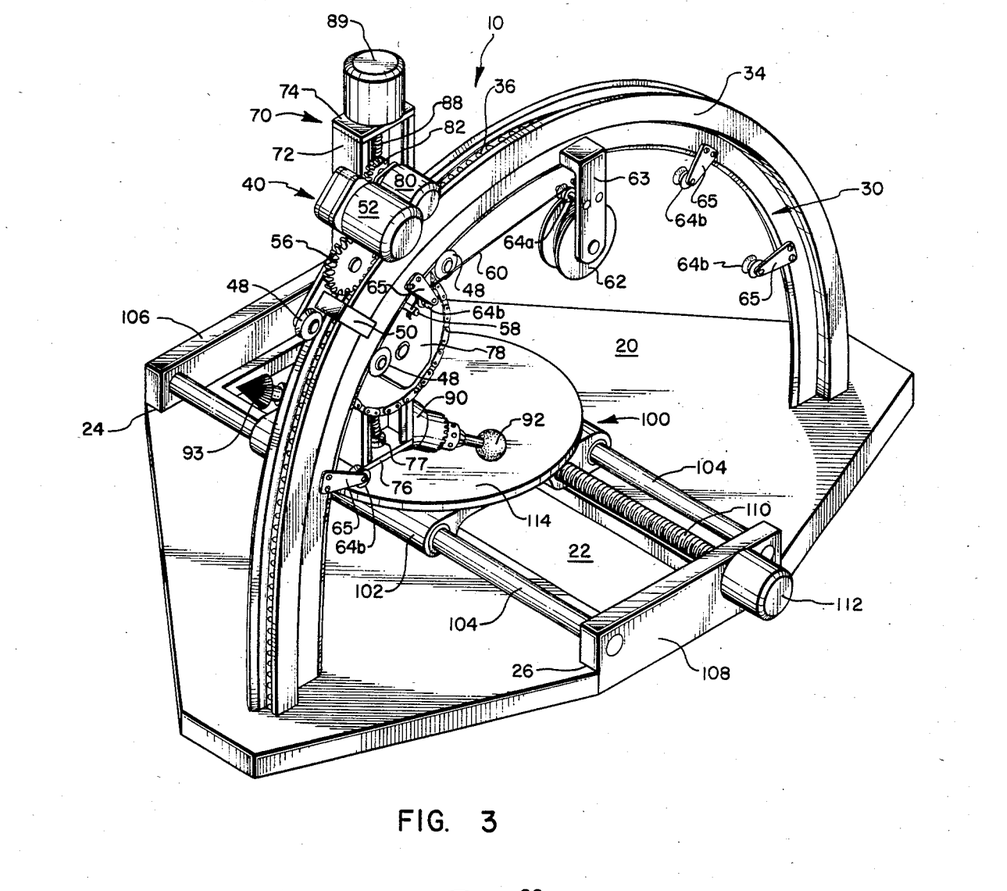
FIG. 3 is a rear perspective view of one presently preferred embodiment of the polar coordinate apparatus of the present invention.

In many applications, in order to reduce the strain on motor 52 during operation of polar coordinate apparatus 10, it may be advantageous to provide a counterbalance to the weight of carrier 40 and its various attachments which will be described below. Such a counterbalance may, for example, comprise a cable 60 which is wound around a spring-biased spool 62, as depicted in FIGS. 1 and 3. Such a device is often referred to as a "negator," such as that which is commercially available as stock number ML 1851 from Stock Drive Products. Spool 62 may be secured adjacent the uppermost portion of arcuate track 30 by means of a bracket 63, as depicted in FIG. 3. Cable 60 may then pass from spool 62 over a pulley 64a, which is also attached to bracket 63. Cable 60 is then connected to carrier 40 by means of a small cable arm 58. Thus, as carrier 40 is positioned along arcuate track 30, cable 60 exerts substantially continuous tension on carrier 40 so as to counterbalance the weight thereof.

In addition, in order to prevent cable 60 from coming into contact with workpiece 12, it may be advantageous to provide a plurality of pulleys 64b which are connected to arcuate track 30, such as, for example, by means of brackets 65. Thus, as depicted in FIG. 3, as carrier 40 is positioned along arcuate track 30 by motor 52, cable arm 58 will draw cable 60 over the top of pulleys 64b. Pulleys 64b will, therefore, retain cable 60 in the proximity of arcuate track 30, thereby preventing cable 60 from coming into contact with workpiece 12.

Figure 4:
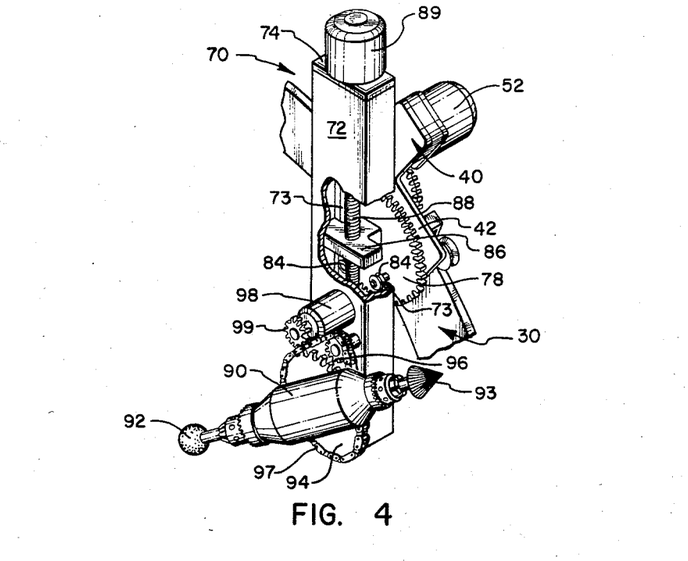
FIG. 4 is a partial perspective view illustrating the radial support arm of the polar coordinate apparatus of the present invention, with portions of the support arm being broken away to reveal internal construction.

The specific structure and configuration of radial support arm 70 is shown best in FIGS. 2 and 4. Radial arm 70 comprises an open, substantially C-shaped channel 72 having end plates 74 and 76 (see FIG. 3) secured to the top and bottom ends thereof, respectively. As shown, channel 72 is positioned such that its open side is toward carrier 40, and channel 72 is slidably mounted in some suitable manner to a sprocket 78. For example, as shown, wheels 84 may be rotatably mounted to sprocket 78 by means of posts 85, and the open edges of channel 72 may be formed as or provided with knife edge tracks 73 which are adapted to engage wheels 84. Further, as shown best in FIGS. 2 and 4, there are preferably at least four such wheels 84, such that channel 72 may slide with respect to sprocket 78 along wheels 84 but is prevented by wheels 84 from either rotating with respect to or falling from sprocket 78.

A worm gear 88 extends from top plate 74 of radial arm 70 to bottom plate 76 thereof and is rotatably journaled in bottom plate 76 by means of a suitable bearing 77 (see FIG. 3). As shown in FIGS. 2 and 4, worm gear 88 also passes through a nut 86 which is securely connected to sprocket 78. Further, a motor 89 is mounted to top plate 74 of radial arm 70 so as to be capable of driving worm gear 88. Thus, as motor 89 rotates worm gear 88, worm gear 88, together with channel 72, moves with respect to nut 86 attached to sprocket 78. Hence, it will be appreciated that radial arm 70 may be selectively positioned relative to sprocket 78 by means of motor 89.

Further, as shown best in FIG. 2, sprocket 78 is rotatably mounted to front plate 42 of carrier 40. In addition, a motor 80 is mounted to back plate 46 of carrier 40, and motor 80 is coupled to a shaft 81 which passes through both back plate 46 and front plate 42 of carrier 40, as illustrated. A drive sprocket 82 is connected to the end of shaft 81 so as to drivingly engage sprocket 78. Thus, by operating motor 80, sprocket 78 may be rotated by sprocket 82, thereby selectively rotating radial arm 70 with respect to carrier 40.

Optionally, in some applications it may be advantageous to provide for extension and retraction of radial arm 70 over a greater distance. This may, of course, be provided by simply using a longer channel 72 for radial arm 70. However, a greater extension and retraction distance may also be provided by using an additional open channel which is slidably mounted to channel 72 and which is further provided with a separate worm gear. Such separate worm gear may then be drivingly coupled to worm gear 88 of channel 72 in some suitable manner. Then, by operating motor 89, both of the worm gears may be driven so as to either extend and retract the two separate channels. By this means, the extension and retraction distance of radial arm 70 may be effectively doubled, if needed.

In addition, for some applications, it may not be necessary that radial arm 70 be rotatable with respect to carrier 40. In such cases, radial arm 70 may be slidably mounted directly to front plate 42 of carrier 40 instead of being mounted to a sprocket 78, as described above.

As depicted in FIG. 4, a suitable implement 90 is mounted adjacent one end of radial arm 70. Implement 90 may be any suitable device which is adapted to perform the desired operation on a workpiece. For example, implement 90 may be some type of end effecter, such as a clamp or claw. Alternatively, as depicted in the figures herein, implement 90 may comprise some type of milling device.

In order to increase the versatility of polar coordinate apparatus 10, it may further be advantageous to mount implement 90 to radial arm 70 such that it can be independently rotated with respect to radial arm 70. In such case, implement 90 may be connected to a sprocket 94, as shown, sprocket 94 being rotatably mounted to radial arm 70. A chain 97 may then be placed around both sprocket 94 and an idler sprocket 96, and chain 97 may be drivingly engaged by a sprocket 99 connected to a motor 98. Thus, by operation of motor 98, implement 90 may be selectively rotated with respect to radial arm 70. Advantageously, such a configuration may also facilitate using two different types of implements on a workpiece without the need for any human intervention. For example, as illustrated in the figures herein, a milling device 90 may be provided with two different milling heads 92 and 93. Thus, motor 98 may be operated so as to select which milling head 92 or 93 will be used to operate upon a workpiece 12.

As illustrated in FIG. 1, a workpiece 12 is supported on a turret 100 while it is being operated upon by polar coordinate apparatus 10. The specific configuration of turret 100 is shown best in FIG. 5. As shown, turret 100 comprises a turret support member 102 which has a workpiece support plate 114 rotatably mounted therein. For example, plate 114 may be rotatably mounted in support member 102 by means of bearings 116, as shown. It should also be noted that plate 114 may have any suitable shape, such as, for example, a substantially circular shape as illustrated herein.

Figure 5:
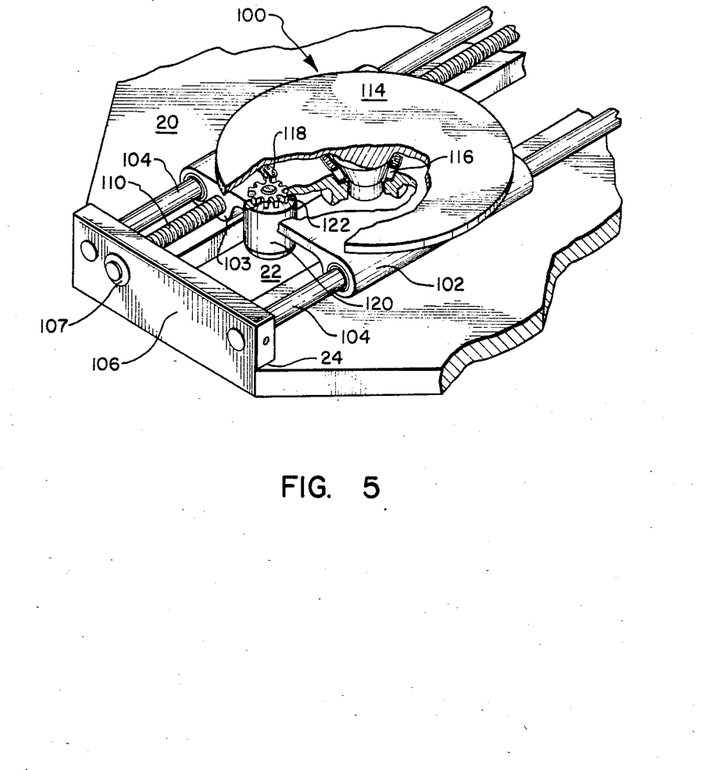
FIG. 5 is a partial perspective view illustrating the turret of the polar coordinate apparatus of the present invention, with portions of the turret being broken away to reveal internal construction.

In addition, plate 114 has a chain 118 secured to the underside thereof, as shown. Chain 118 may be secured to plate 114 in any suitable manner. For example, chain 118 may be secured to plate 114 by means of welding. Alternatively, chain 118 may be secured to plate 114 by means of suitable clamps. Further, a motor 120 is mounted to support member 102 of turret 100 so as to be located within recess 22 of base 20, and motor 120 is provided with a drive sprocket 122 which drivingly engages chain 118. Hence, by operating motor 120, plate 114 may be rotated about a substantially vertical axis with respect to support member 102.

As further depicted in FIG. 5, support member 102 is slidably received on guide rods 104. Guide rods 104 are oriented substantially parallel to one another in a substantially horizontal plane. Thus, as depicted in FIG. 1, guide rods 104 allow turret 100 to move along a horizontal axis which is substantially perpendicular to the plane defined by arcuate track 30. As shown best in FIGS. 1 and 3, each end of guide rods 104 is secured within a plate 106 or 108. In addition, plates 106 and 108 are secured within recesses 24 and 26, respectively, of base 20 so as to maintain guide rods 104 in the orientation described above.

Further, a worm gear 110 extends between plates 106 and 108 and is threadably engaged by a nut 103 (see FIG. 5) secured within support member 102. One end of worm gear 110 is rotatably maintained by plate 106 by means of a bearing 107, and the other end of worm gear 110 is drivingly coupled through plate 108 to a motor 112. Hence, by operating motor 112, worm gear 110 may be rotated so as to selectively position turret 100 along guide rods 104.

Polar coordinate apparatus 10 of the present invention may be formed in a variety of ways and from a number of suitable materials. The particular materials which are chosen for polar coordinate apparatus 10 will depend largely upon the particular application for which polar coordinate apparatus 10 is to be used. For example, polar coordinate apparatus 10 could be formed almost entirely of steel. Alternatively, arcuate track 30 and base 20 could be formed of steel, while the other components of polar coordinate apparatus 10 are formed of aluminum. Further, in some light applications, virtually all of the components of polar coordinate apparatus 10 might be formed of aluminum.

In addition, a number of different types of motors may be used to drive the various components of polar coordinate apparatus 10. For example, the various motors may comprise DC stepper motors. Such motors have the advantage of being relatively inexpensive and may permit polar coordinate apparatus 10 to be controlled by a central processing unit without the need for a complex feedback system. Suitable stepper motors are, for example, commercially available from Superior Electric Company (catalog No. M061-FC02) and may be used for the motors 52, 80, 89, 98, 112, and 120 described above.

In some applications, however, it may not be possible to obtain sufficient torque or smoothness by the use of such DC stepper motors. In such cases, it may be advantageous to provide conventional DC drive motors for use as motors 52, 80, 89, 98, 112, and 120. When such motors are used, however, a more complex control mechanism will be required if polar coordinate apparatus 10 is to be controlled accurately and effectively by a central processing unit. Moreover, a feedback mechanism of some sort will be essential in order to permit a central processing unit to determine how far a particular component of polar coordinate apparatus 10 has been moved.

In use, a workpiece 12 is first secured on turret 100 as depicted in FIG. 1. Workpiece 12 may be secured to turret 100 in any suitable manner, such as, for example, by means of adhesive, bolts, or pegs. Once workpiece 12 has been so secured, polar coordinate apparatus 10 may be readily used to perform a wide variety of quite complex operations.

For example, when using a milling device 90 with polar coordinate apparatus 10, polar coordinate apparatus 10 may be readily used to mill curvilinear surfaces and edges. Such milling of curvilinear surfaces is facilitated by the fact that polar coordinate apparatus 10 is structurally adapted to being programmed and manipulated in terms of polar coordinates (that is, coordinates which comprise one linear distance and two angles). For example, radial arm 70 may be oriented so as to be substantially perpendicular to arcuate track 30 and milling device 90 may be oriented so as to be substantially parallel to radial arm 70. In this manner, polar coordinate instructions may be readily executed by selectively varying the angular orientation of workpiece 12 by rotating turret 100 and/or by selectively varying the angular orientation of carrier 40 along arcuate track 30 and the radial position of milling device 90 by either extending or retracting radial arm 70. Significantly, curvilinear surfaces and edges, which are quite common in industrial designs, are very easily defined in terms of such a polar coordinate system.

Polar coordinate apparatus 10 is also readily adapted to performing a wide variety of operations which require rectilinear motion. For example, by orienting milling device 90 so as to be substantially perpendicular to radial arm 70 and by orienting radial arm 70 so as to be substantially vertical, a vertical surface may be easily formed on a three-dimensional object. This may be accomplished either by moving milling device 90 in a vertical direction by means of radial arm 70 and then successively advancing turret 100 along guide rods 104, or alternatively, by advancing turret 100 along guide rods 104 and then successively advancing milling device 90 in a vertical direction by means of motor 89 of radial arm 70. In either event, it will be appreciated that a substantially vertical planar surface may be quite easily formed.

Polar coordinate apparatus 10 also facilitates approaching a workpiece from virtually any angular orientation. As set forth above, workpiece 12 may be either rotated or translated in a substantially horizontal plane by appropriately manipulating turret 100. Moreover, implement 90 can be easily positioned radially, vertically, horizontally, or in virtually any other orientation in between. Thus, it will be readily appreciated that, by properly operating the various control mechanisms of polar coordinate apparatus 10, implement 90 may be caused to approach workpiece 12 from virtually any skew or angular direction.

From the above discussion, it will be appreciated that the present invention provides an apparatus for performing an operation on a three-dimensional workpiece which may be easily manipulated to perform a wide variety of operations from a wide variety of different approach angles. Since the apparatus of the present invention is structurally adapted to being programmed and manipulated in terms of polar coordinates, the present invention provides an apparatus which may be readily manipulated such that the working implement follows a desired curvilinear path. In addition, due to the various mechanisms for positioning both the implement and the workpiece with respect to one another, the present invention provides an apparatus for operating on a three-dimensional workpiece which may be readily controlled to approach the workpiece from virtually any angular direction. Further, since the apparatus of the present invention does not include parallel vertical tracks which must be accurately synchronized with one another, the present invention provides an apparatus for operating on a three-dimensional workpiece which is easy to maintain in adjustment and requires minimal ongoing maintenance. Additionally, the various control mechanisms of the apparatus of the present invention permit the apparatus to be easily manipulated to perform a wide variety of curvilinear and rectilinear operations. Hence, it will be readily appreciated that the present invention provides an apparatus for operating on a three-dimensional workpiece which may be easily controlled by a central processing unit so as to perform a wide variety of operations.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by U.S. Letters Patent is:

1. An apparatus for performing an operation on a workpiece, the apparatus comprising:
   an implement adapted to performing said operation;
   first means comprising a radial support arm for selectively positioning the implement along on arcuate path formed about a first axis, said arcuate path defining a plane;
   secoond means for selectively positioning the implement along radii essentially within said plane and extending from the first axis to the arcuate path;

third means for selectively rotating the implement about either of a second and third axis, said second axis both intersecting said plane through said radial support arm and being substantially parallel to the first axis, and said third axis both intersecting said plane through said implement and being substantially parallel to the first axis; and means for selectively bringing each portion of said workpiece into said plane, whereby the implement is able to selectively perform said operation on substantially every portion of said workpiece.

2. An apparatus as defined in claim 1 wherein the implement comprises a milling device.

3. An apparatus as defined in claim 1 wherein the first means for positioning the implement comprises:
an arcuate track;
means for suspending the implement from the arcuate track; and
means for selectively positioning said implement suspending means along the arcuate track.

4. An apparatus as defined in claim 1 wherein the second means for positioning the implement comprises:
a radial support arm connected to the implement, said radial support arm being slidably connected to the first means for positioning the implement; and
means for selectively sliding the radial support arm along radii extending from the first axis to the arcuate path.

5. An apparatus as defined in claim 1 further comprising means for selectively rotating the implement about another axis that both intersects a portion of the implement and that is substantially parallel to the first axis.

6. An apparatus as defined in claim 1 wherein the means for selectively bringing each portion of said workpiece into said plane defined by the arcuate path comprises means for selectively positioning said workpiece along the first axis.

7. An apparatus as defined in claim 6 wherein the means for positioning said workpiece along the first axis comprises:
means for supporting said workpiece; and
means for selectively positioning said workpiece supporting means along the first axis.

8. An apparatus as defined in claim 7 wherein the means for selectively positioning the workpiece supporting means comprises:
a worm gear oriented so as to be substantially parallel to the first axis, said worm gear drivingly engaging a portion of the workpiece supporting means; and
means for selectively driving the worm gear.

9. An apparatus as defined in claim 1 wherein the means for selectively bringing each portion of said workpiece into said plane defined by the arcuate path comprises means for selectively rotating said workpiece about another axis that is both substantially perpendicular to the first axis and that lies substantially within said plane defined by the arcuate path.

10. An apparatus as defined in claim 9 wherein the means for selectively rotating said workpiece comprises:
means for supporting said workpiece; and
means for selectively rotating said workpiece supporting means about said other axis.

11. A polar coordinate apparatus for performing an operation on a workpiece, the apparatus comprising:
an arcuate track;
a radial support arm, said radial support arm being oriented so as to be substantially parallel to a plane defined by the arcuate track;
means for suspending the radial support arm from the arcuate track, said suspending means being slidably connected to the radial support arm;
first means for selectively positioning the radial support arm suspending means along the arcuate track;
first means for selectively sliding the radial support arm with respect to the radial support arm suspending means;
first means for rotating the radial support arm with respect to the radial support arm suspending means about a first axis, said first axis intersecting both a portion of the radial support arm and a portion of the radial support arm suspending means and said first axis being substantially perpendicular to the plane defined by the arcuate track;
an implement adapted to performing said operation, said implement being connected to the radial support arm;
means for supporting said workpiece; and
second means for selectively positioning the workpiece supporting means so as to selectively bring each portion of said workpiece into a second plane, said second plane being substantially parallel to the plane defined by the arcuate track, whereby the implement is able to selectively perform said operation on substantially every portion of said workpiece.

12. A polar coordinate apparatus as defined in claim 11 further comprising second means for rotating the implement with respect to the radial support arm about a second axis, said second axis intersecting both a portion of the implement and a portion of the radial support arm and said second axis being substantially parallel to the first axis.

13. A polar coordinate apparatus as defined in claim 12 wherein the arcuate track is formed as a double knife edge track and wherein the radial support arm suspending means comprises:
a rigid carrier; and
a plurality of first wheels connected to the rigid carrier, said first wheels being adapted to roll along the double knife edge track.

14. A polar coordinate apparatus as defined in claim 13 further comprising a plurality of second wheels attached to the radial support arm suspending means and wherein the radial support arm comprises two facing knife edge tracks which are adapted to both roll along and be retained by said second wheels.

15. A polar coordinate apparatus as defined in claim 14 further comprising a chain secured to the arcuate track along the length thereof and wherein the first positioning means comprises:
a first sprocket rotatably connected to the radial support arm suspending means so as to drivingly engage said chain; and
a motor for selectively driving the first sprocket.

16. A polar coordinate apparatus as defined in claim 15 wherein the radial support arm suspending means has a nut secured thereto and wherein the first sliding means comprises:
a worm gear extending along the length of the radial support arm and being substantially parallel thereto, said worm gear drivingly engaging said nut; and
a motor for selectively driving the worm gear.

17. A polar coordinate apparatus as defined in claim 16 wherein the radial support arm suspending means further comprises a rotatable second sprocket and wherein the second wheels are attached to said second sprocket, and wherein the first rotating means comprises a motor for selectively rotating the second sprocket such that the radial support arm is selectively rotated with respect to the radial support arm suspending means about the first axis.

18. A polar coordinate apparatus as defined in claim 17 wherein the radial support arm further comprises a rotatable third sprocket and wherein the implement is connected to said third sprocket, and wherein the second rotating means comprises a motor for selectively rotating the third sprocket such that the implement is selectively rotated with respect to the radial support arm about the second axis.

19. A polar coordinate apparatus as defined in claim 18 wherein the implement is a double headed implement.

20. A polar coordinate apparatus as defined in claim 19 further comprising a counterbalancing mechanism connected to both the arcuate track and the radial support arm suspending means so as to counterbalance the weight of the radial support arm suspending means, the radial support arm, and the implement as the radial support arm suspending means is selectively positioned along the arcuate track.

21. A polar coordinate apparatus as defined in claim 20 wherein the counterbalancing mechanism comprises:
- a spring biased spool which is secured to a central portion of the arcuate track; and
- a cable wound around the spring biased spool, an end of the cable being connected to the radial support arm suspending means such that the cable exerts a counterbalancing tension on the radial support arm suspending means as the radial support arm suspending means is selectively positioned along the arcuate track away from said central portion thereof.

22. A polar coordinate apparatus as defined in claim 21 further comprising pulleys connected to the arcuate track so as to receive the cable as the radial support arm suspending means is selectively positioned along the arcuate track away from said central portion thereof, said pulleys preventing the cable from contacting said workpiece.

23. A polar coordinate apparatus as defined in claim 11 wherein the second positioning means comprises third means for selectively positioning the workpiece supporting means along another axis which is substantially perpendicular to the plane defined by the arcuate track.

24. A polar coordinate apparatus as defined in claim 13 wherein the workpiece supporting means comprises two substantially parallel guide rods and a support plate which is slidably maintained on said guide rods, and wherein the third positioning means comprises second means for sliding the support plate along the guide rods.

25. A polar coordinate apparatus as defined in claim 24 further comprising a nut secured to the support plate and wherein the second sliding means comprises:
- a worm gear oriented so as to be substantially parallel to the guide rods, said worm gear drivingly engaging said nut; and
- a motor for selectively driving the worm gear.

26. A polar coordinate apparatus as defined in claim 11 wherein the second positioning means comprises first means for selectively rotating at least a portion of said workpiece supporting means such that said workpiece is rotated about another axis lying substantially within the second plane.

27. A polar coordinate apparatus as defined in claim 26 wherein the workpiece supporting means comprises a rotatable support plate and wherein said first rotating means comprises second means for rotating the support plate.

28. A polar coordinate apparatus as defined in claim 27 wherein the second rotating means comprises:
- a chain secured to the support plate;
- a sprocket drivingly engaging the chain; and
- a motor for selectively driving the sprocket.

29. A polar mill apparatus, comprising:
- a rigid base;
- an arcuate track secured to the base so as to be substantially perpendicular thereto;
- a rigid carrier slidably suspended from the arcuate track;
- means for selectively sliding the carrier along the arcuate track;
- a rigid support arm slidably and rotatably connected to the carrier;
- means for selectively sliding the support arm with respect to the carrier;
- means for selectively rotating the support arm with respect to the carrier;
- a milling device rotatably mounted to the support arm adjacent an end of said support arm;
- means for rotating the milling device with respect the support arm;
- a turret for supporting said workpiece;
- means for rotating at least a portion of the turret about a first axis, said first axis being substantially perpendicular to the base; and
- means for selectively positioning the turret adjacent the base along a second axis, said second axis being substantially perpendicular to a plane defined by the arcuate track.

30. A method for performing an operation on a workpiece with an implement, the method comprising the steps of:
- selectively positioning the implement along an arcuate path formed about a first axis, said arcuate path defining a plane;
- selectively positioning the implement along radii extending from the first axis essentially within said plane;
- selectively rotating the implement about either a second or third axis, said second and third axes both intersecting said plane and being substantially parallel to the first axis; and
- selectively bringing each portion of the workpiece into said plane, whereby the implement is able to selectively perform said operation on substantially every portion of the workpiece.

31. A method as defined in claim 30 further comprising the step of selectively activating the first and second positioning means and the means for selectively bringing each portion of said workpiece into said plane defined by the arcuate path so as to successively operate on other selected portions of said workpiece.

* * * * *

UNITED STATES PATENT AND TRADEMARK OFFICE
CERTIFICATE OF CORRECTION

PATENT NO. : 4,589,174

DATED : May 20, 1986

INVENTOR(S) : Dell K. Allen

It is certified that error appears in the above-identified patent and that said Letters Patent is hereby corrected as shown below:

```
Column 2, line 30,, "postion" should be --position--
Column 10, line 63, "on arcuate" should be --an arcuate--
Column 10, line 66, "secoond" should be --second--
```

Signed and Sealed this

Ninth Day of September 1986

[SEAL]

Attest:

DONALD J. QUIGG

Attesting Officer

Commissioner of Patents and Trademarks